July 15, 1924.  1,501,727
C. H. ROBINS
MACHINE FOR SPREADING BREAD WITH BUTTER OR THE LIKE
Filed Sept. 22, 1922  2 Sheets-Sheet 1
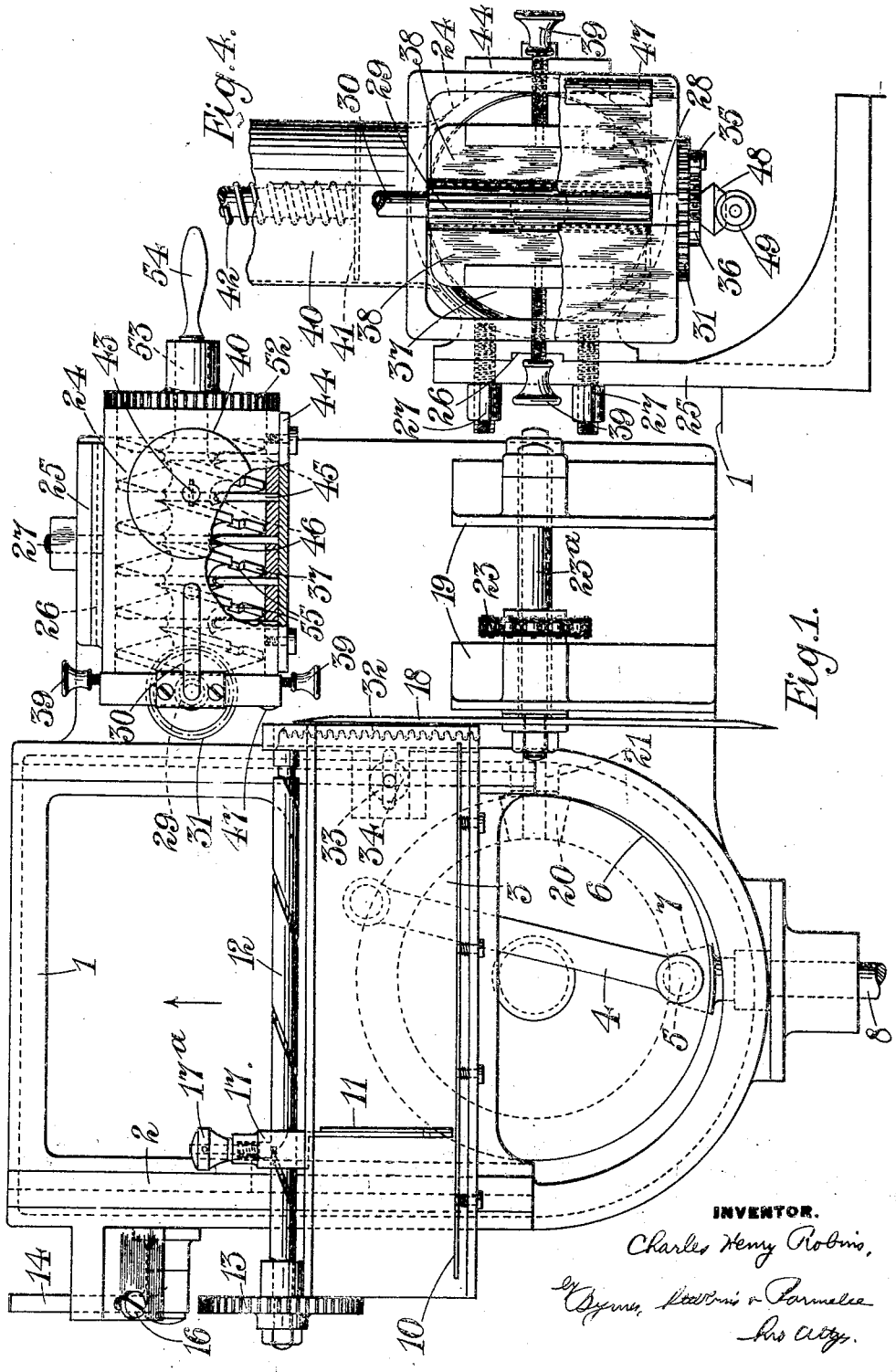

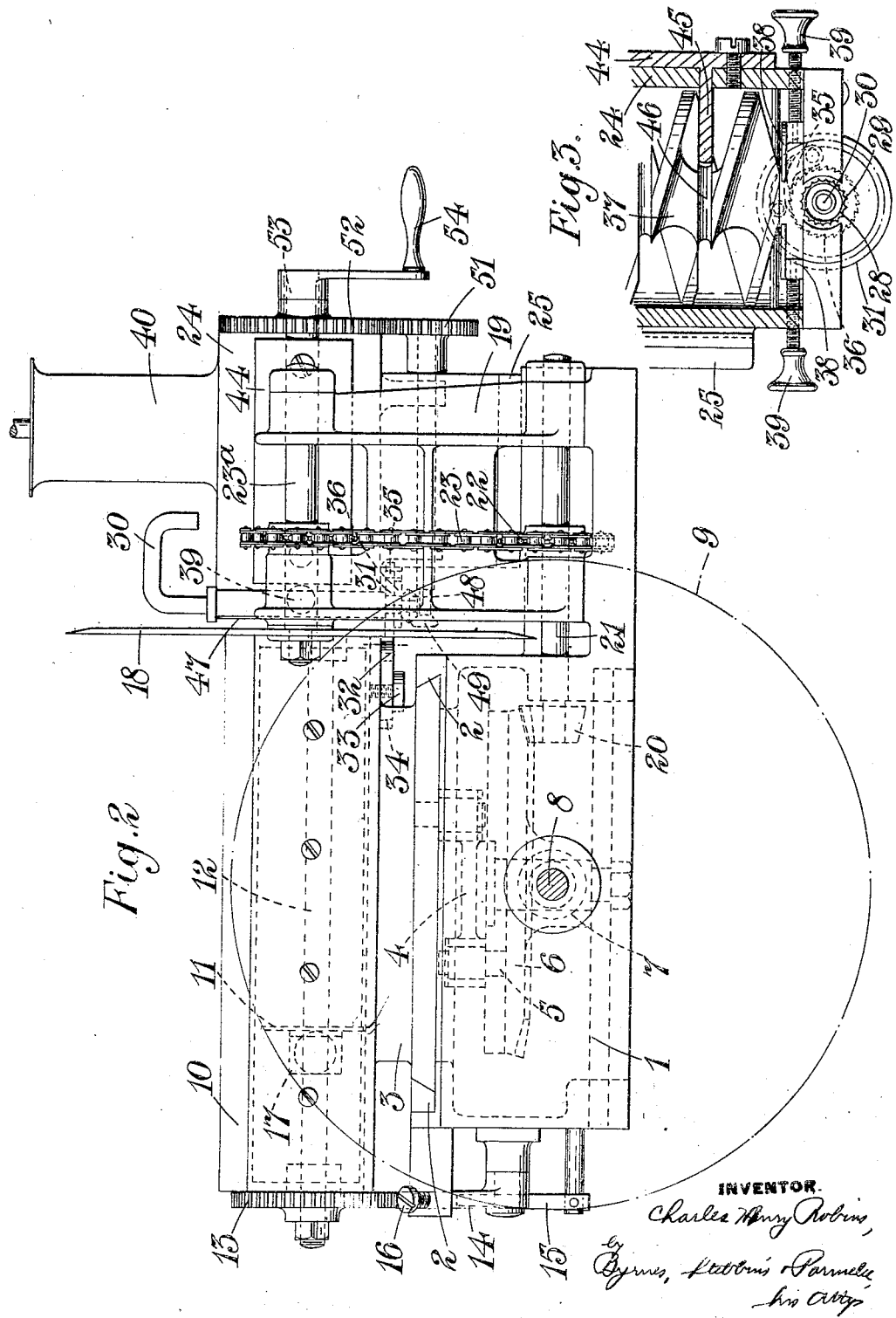

Patented July 15, 1924.

1,501,727

UNITED STATES PATENT OFFICE.

CHARLES HENRY ROBINS, OF KETTERING, ENGLAND, ASSIGNOR TO CHARLES WICKSTEED & COMPANY (1920) LIMITED, OF KETTERING, NORTHAMPTONSHIRE, ENGLAND, A BRITISH COMPANY.

MACHINE FOR SPREADING BREAD WITH BUTTER OR THE LIKE.

Application filed September 22, 1922. Serial No. 589,869.

*To all whom it may concern:*

Be it known that I, CHARLES HENRY ROBINS, a subject of the King of England, residing at Kettering, Northamptonshire, England, have invented certain new and useful Improvements in Machines for Spreading Bread with Butter or the like, of which the following is a specification.

This invention relates to machines for spreading bread with butter or the like, such as bread-and-butter cutting and spreading machines, and has for its main object to provide improved means for spreading the butter and feeding the butter to the spreading apparatus.

A machine for spreading bread with butter or the like according to this invention has combined with means for feeding the butter forward for spreading, a roller, situated in the butter-delivery opening and in such position that it can roll in contact with the bread for the purpose of spreading the butter thereon, the surface of which roller is shaped, for example channelled longitudinally, to hold the butter.

Another feature of this invention consists in providing in a machine for spreading bread with butter or the like, the combination, with a screw-feed for the butter, of one or more pins which project between the threads of the screw at points where the screw is cut away to admit them and are held (for example by being secured to the stationary barrel containing the screw) against movement bodily with the screw.

When this screw-feed is used with the spreading-roller described above, the apparatus is particularly efficient, but it will be appreciated that this screw-feed with the projecting pins, as described above, could be used for delivering butter to other spreading-means than the roller described above.

When the roller is employed in the delivery opening for the butter, there may be used therewith one or more gates situated between the means for advancing the butter to the delivery-opening containing the roller and means for adjusting the said gate or gates to increase or decrease their baffling action and corresponding regulation of the rate of delivery of the butter.

Other features of the invention are described hereinafter and pointed out in the claims.

In the accompanying drawings which illustrate one embodiment of this invention—

Figure 1 is a plan of a bread-and-butter cutting and spreading machine;

Figure 2 is a side elevation of the same;

Figure 3 is a horizontal section through the butter feeding and spreading apparatus, and Figure 4 shows an elevation of the butter-feeding and spreading apparatus in part-section.

Like numerals indicate like parts throughout the drawings.

The bed 1 is provided on its upper face with V-guides 2 on which slides a bread-carrying trough 3. Reciprocating movement is imparted to this trough by a connecting-rod 4 which works on a crank-pin 5 carried by a horizontal bevel-wheel 6. This bevel-wheel is driven by a bevel-pinion 7 on a shaft 8, which may be actuated by a hand-wheel.

The trough 3 has an adjustable side-plate 10 and is swept by a feed-member 11 operated by a screw 12. This screw carries a wheel 13 which is driven step-by-step by means of a pawl 14. This pawl is kept in its normal position by a spring 15 and its height is adjusted by a screw 16. The rate of feed of the bread can be regulated by the adjustment of this screw 16.

The sliding feed-member 11 is secured to the screw by a nut 17 which comprises a member sliding on the main body of the screw 12 and a spring-detent which enters the thread in the screw and thus constitutes the worm-portion of the nut. The spring-detent can be released by pulling outwards the knob 17ª for the purpose of returning the presser-plate by hand quickly without rotating the screw.

The knife 18 is mounted in bearing members 19 and driven by the bevel-wheel 6 by means of a bevel-pinion 20, shaft 21, and sprocket-wheel 22. A chain 23 connects this sprocket-wheel with another sprocket-wheel on the shaft 23ª which has fastened on it the knift 18.

The butter-carrier and spreader comprises a barrel 24 horizontally disposed on a support 25 in such manner as to be adjustable on the said support in the direction of feed of the butter to bring the apparatus nearer to or further from the bread position. This adjustment may be effected by slides indicated at 26 and fastening-nuts 27 for locking it at the point to which it is adjusted.

At the delivery-end of the barrel 24 there is a butter-delivery opening 28 in which is mounted a fluted or longitudinally channelled roller 29. A pipe 30 may run down the centre of this roller for the purpose of conducting any heating medium to the roller, but this is generally found unnecessary.

The roller 29 is driven intermittently by a gear-wheel 31 (Figures 3 and 4) arranged to engage a rack 32 (Figure 1) on the bread trough member 3. The rack can be adjusted in the direction of adjustment of the butter spreader by means of a slotted lug 33 and fastening bolt 34 (Figure 1) so as to enable it to follow the adjustments of the butter-spreading device. The gear-wheel 31 is loosely mounted on the shaft of the butter-roller and carries a pawl 35 which engages a ratchet-wheel 36 fast on the butter-spreading roller whereby a one-way clutch is provided so that the butter-roller will only be rotated when the bread-carrying trough is travelling in the direction from the butter-spreading roller towards the knife 18.

The amount of butter fed through is regulated by two gates 38 which can be adjusted nearer to or further from one another by screws 39. It will thus be seen that the size of the delivery-opening can be varied by these gates and thus a greater or smaller amount of butter can be fed to the roller per slice of bread to be spread.

The butter barrel 24 has in it a feed-screw 37 and is provided with a hopper 40 whereby the butter is introduced and this is pressed down by a plate 41 and spring 42 so that the butter will be continuously taken up by the screw 37.

On the exterior of the barrel 24 is secured a plate 44 (Figure 3) having on it pins 45 which project through the wall of the barrel 24 into grooves 46 formed in the screw so that these pins lie between the threads of the screw. It is found that if these pins are not used the butter merely turns round in the barrel as a solid mass with the screw instead of maintaining a continuous feed forward. It will be seen (Figure 1) that the portions of the screw which lie between the pins 45 do not contain more than about one complete turn of thread. The amount of thread between each pair of pins may, of course, be varied, but about a single turn is found to give good results. A shoulder or blade 47 projects from the front face of the barrel 24 on that side which lies between the butter-spreading roller and the knife to serve as a spreading means for the butter after it has been fed on to the bread.

The screw 37 is rotated by gear-wheels 51 and 52, the wheel 51 receiving its motion from bevel-gearing 48 and 49 driven by the ratchet-wheel 36. The shaft 53 of the feed-screw is provided with a handle 54 so that the screw can be turned by hand when desired.

The operation of this device is as follows:

The bread-trough is continuously reciprocated and as it travels in the direction of the arrow (Figure 1) the wheel 13 will be brought over the pawl 14 so that on the return movement, the wheel 13 will be rotated a given number of teeth. This will rotate the shaft 12 and operate the presser-plate 11 so that the bread is fed forward against the butter-roller 29. As the bread-trough then continues its movement backwards in the reverse direction of the arrow (Figure 1) the butter-roller will be operated by the rack 32 so as to roll against the bread, and the feed-screw will be simultaneously operated to feed the butter forward. The butter will thus be deposited on the bread and will be further spread by the blade 47, after which the bread comes against the knife 18, which is continuously rotating, and is sliced thereby. On the return movement of the feed-trough no rotation of the butter-roller 29 and its screw-feed 37 takes place.

The screw 37 may be provided with a plurality of notches 55 in its threads, as indicated in Figure 1, at one or more points round the circumference to permit any excess of butter to travel back, as it will be appreciated that as the feed of the screw is always the same means must be provided for allowing a backward flow of the butter, as when the gates 38 are partially closed the full delivery does not take place.

Instead of two gates one gate only could be provided on that side of the roller from which the butter is delivered, that is on the left-hand side as viewed in Figure 3. and this gate could be put more forward if desired so that it would lie close behind the member in which the delivery-opening 28 is formed, or could even virtually take the place of this member and feed edgewise and practically radially towards the butter-roller.

It will be understood that although the butter-spreading roller can be used with other means for feeding the butter to it, that described is found to have great advantages over a plunger-feed for the butter, for example, as the latter is not found to deliver the butter with such evenness on to the roller. The churning action of the screw and pins operating therein brings the butter to a condition in which the roller readily receives it and delivers it on to the bread.

Obviously, various means may be employed for feeding the bread, and operating the various mechanisms without departing from the scope of the invention as defined in the claims.

I claim—

1. In a machine for spreading bread with butter or like spreadable material, the combination of a container for holding the spreadable material and having a delivery opening, a single roller only mounted to rotate in said opening and forming with one edge thereof a delivery outlet, a bread carrier for presenting bread in front of said opening, which bread-carrier and container are movable one in relation to the other so as to traverse the bread in front of said opening, feeding means in the container for feeding the material through the said outlet to the face of the bread moving in front of the same, said roller being arranged to roll in contact with said face of the bread and having its periphery so shaped that it is adapted to hold the said material and feed it outside said opening from the outlet at one side of the roller to the other side thereof, and spreading means situated at the side of said roller remote from said outlet for spreading the material on the bread after the material has been fed onto the bread, substantially as described.

2. In a machine for spreading bread with butter or like spreadable material, the combination of a container for holding the spreadable material and having a delivery opening, a single roller only mounted to rotate in said opening and forming with one edge thereof a delivery outlet, a bread-carrier for presenting bread in front of said opening, which bread-carrier and container are movable one in relation to the other so as to traverse the bread in front of said opening, feeding means in the container for feeding the material through the said outlet to the face of the bread moving in front of the same, said roller being arranged to roll in contact with said face of the bread and having its periphery so shaped that it is adapted to hold the said material and feed it outside said opening from the outlet at one side of the roller to the other side thereof, and spreading means situated at the side of the roller remote from said outlet for spreading the material on the bread after the material has been fed onto the bread, which spreading means is in the form of a blade standing proud of the roller, substantially as described.

3. In a machine for spreading bread with butter or like spreadable material, the combination of a container for holding the spreadable material and having a delivery opening, a single roller only mounted to rotate in said opening at one edge thereof and forming with the opposite edge a delivery outlet, a bread-carrier for presenting bread in front of said opening, which bread-carrier and container are movable one in relation to the other so as to traverse the bread in front of said roller, feeding means in the container for feeding the material through the said outlet to the face of the bread moving in front of the same, said roller being arranged to roll in contact with said face of the bread and having its periphery so shaped that it is adapted to hold the said material, and feed it from one side of the roller to the other outside the container, and a blade situated at the side of said roller remote from said outlet for spreading the material on the bread after the material has been fed onto the bread, which blade is spaced away from the adjacent edge of said opening and constitutes an abutment for the bread when the latter is fed towards the delivery opening in a direction at right-angles thereto, substantially as described.

4. In a machine for spreading bread with butter or like spreadable material, the combination of a container for holding the spreadable material and having a delivery outlet, a bread-carrier for presenting bread in front of said outlet, which bread-carrier and container are movable one in relation to the other so as to traverse the bread in front of said outlet, feeding means in the container for feeding the material through the said outlet to the face of the bread moving in front of the same, a single roller only mounted to rotate in said outlet in such a position that it can roll in contact with said face of the bread, which roller has its periphery so shaped that it is adapted to hold the said material, spreading means situated at the side of said outlet towards which the bread-contacting portion of the roller rotates for spreading the material on the bread after the material has been fed onto the bread, a gate situated at said outlet between said feeding means and said roller for varying the effective size of said outlet, and means for adjusting the position of said gate, substantially as described.

5. In a machine for spreading bread with butter or like spreadable material, the combination of a container for holding the spreadable material having a delivery opening, a single roller only mounted to rotate in said opening and forming with only one edge thereof a delivery outlet, a bread-carrier for presenting bread in front of said opening, actuating means for moving said carrier and container, one in relation to the other, in two directions at right-angles to one another so as to traverse the bread in front of said roller and reciprocate the bread in a direction in line with said outlet, feeding means in the container for feeding the material through the said outlet to the face of the bread moving in front of the same, said roller being arranged to roll in contact with said face of the bread and having its periphery so shaped that it is adapted to feed the material outside said opening from the outlet at one side of the roller to the other side thereof and spreading means situated at the side of the roller remote from the outlet for spreading the material on the bread after the material has been fed on to the bread, said actuating means being so arranged as to present the bread with the leading edge of its said face at said spreading means at the commencement of the spreading stroke, substantially as described.

6. In a machine for spreading bread with butter or like spreadable material, the combination of a cylindrical container for holding the spreadable material and having a delivery outlet, a feed screw movably fitting in the container, which feed screw is mutilated by having a plurality of parts of the thread cut away each in a plane transverse to the axis of rotation of the screw, and pins one for each part of the thread cut away, fixedly mounted on the wall of the container, and extending radially into the mutilated portions of the screw up to the shank thereof, the pins being spaced away approximately equal to the pitch of the screw so as to have substantially a single complete turn of the thread between each two adjacent pins, substantially as described.

7. In a machine for spreading bread with butter or like spreadable material, the combination of a cylindrical container for holding the spreadable material and having a delivery outlet, a feed-screw movably fitting in the container, which feed-screw is mutilated by having a plurality of parts of the thread cut away each in a plane transverse to the axis of rotation of the screw, and pins, one for each part of the thread cut away, fixedly mounted on the wall of the container, and extending radially into the mutilated portions of the screw up to the shank thereof, the pins being spaced away approximately equal to the pitch of the screw so as to have substantially a single complete turn of the thread between each two adjacent pins, the turns of the thread of the screw having each an aperture arranged in a line extending from one end of the screw to the other, which apertures together constitute a passage that extends lengthwise through the screw, substantially as described.

8. In a machine for spreading bread with butter or like spreadable material, the combination with a container for holding the spreadable material and having a delivery-outlet, a bread-carrier for presenting bread in front of said outlet, which bread-carrier and container are movable one in relation to the other so as to move the bread from one side to the other of said outlet, and feeding means in the container for feeding the material through the said outlet to the bread, of a roller mounted to rotate in said outlet in such a position that it can roll in contact with the bread, which roller has its periphery so shaped that it is adapted to hold the said material, and means operatively connecting said roller with said carrier so as to positively and automatically rotate the roller when the carrier moves the bread in one direction past said outlet, substantially as described.

9. In a machine for spreading bread with butter or like spreadable material, the combination of a container for holding the spreadable material and having a delivery-outlet, a bread-carrier for bread, which carrier and container are movable one in relation to the other to move the bread from one side to the other of the outlet, feeding means in the container for feeding the said material through said outlet on to the bread, a roller mounted to rotate in said outlet in such a position that it can roll in contact with the bread, which roller has its periphery so shaped that it is adapted to convey the said material, said feeding means comprising a feed-screw which is mutilated by having one or more parts of the thread cut away each in a plane transverse to the axis of rotation of the screw, means held against bodily movement with the screw and extending radially into the mutilated portions of the screw, and means operatively connecting said roller and said feed-screw with said carrier so as automatically to rotate said roller and said feed-screw during such time as the roller is in contact with the bread, substantially as described.

10. In a machine for spreading bread with butter or like spreadable material, the combination with a container for the spreadable material having a delivery-outlet, and feeding means in the container for feeding the said material through the said outlet, of a roller mounted to rotate in said outlet in such a position that it can roll in contact with bread presented in front of the outlet, which roller has its periphery so shaped that it is adapted to hold the said material, a gate situated at said outlet between said feeding means and said roller for varying the effective size of the outlet, and means for adjusting the position of said gate, the turns of the threads of the screw having each a peripheral notch arranged in a line parallel with the axis of the screw, which notches together constitute a passage extending from one end of the screw to the other, substantially as described.

In testimony whereof I have signed my name to this specification in the presence of two subscribing witnesses.

CHARLES HENRY ROBINS.

Witnesses:
HARRY I. WIDGE,
ARTHUR A. LEAN.